United States Patent [19]

Bishop

[11] 4,445,422

[45] May 1, 1984

[54] POWER STEERING VALVE

[76] Inventor: Arthur E. Bishop, 17 Burton St., Mosman, N.S.W., Australia

[21] Appl. No.: 304,643

[22] Filed: Sep. 23, 1981

Related U.S. Application Data

[63] Continuation of Ser. No. 115,412, Jan. 25, 1980, abandoned.

[30] Foreign Application Priority Data

Jan. 26, 1979 [AU] Australia .............................. PD7480

[51] Int. Cl.³ .............................................. F15B 9/10
[52] U.S. Cl. ....................................... 91/434; 91/372; 91/375 A; 91/443; 137/625.24
[58] Field of Search ................... 91/375 A, 373, 372, 91/434, 467, 443, 375 R; 137/625.24

[56] References Cited

U.S. PATENT DOCUMENTS 3,022,772 2/1962 Zeigler .............................. 91/375 A
3,145,626 8/1964 Vickers et al. ................... 91/375 A Primary Examiner—Paul E. Maslousky

[57] ABSTRACT

An open center hydraulic control valve of the type useful in automotive vehicles and elsewhere, in which the valve directs fluid from an inlet to a sump via first and second parallel passages including, respectively, a first outlet to a left turn cylinder and a second outlet to a right turn cylinder and in which closure of the first passage includes controlled closure of flow from the inlet to the first outlet and also controlled closure of the flow from the first outlet to the sump to provide a controlled reduced assist and improved steering stability particularly in and near the straight-ahead low turning effort valve condition.

5 Claims, 12 Drawing Figures

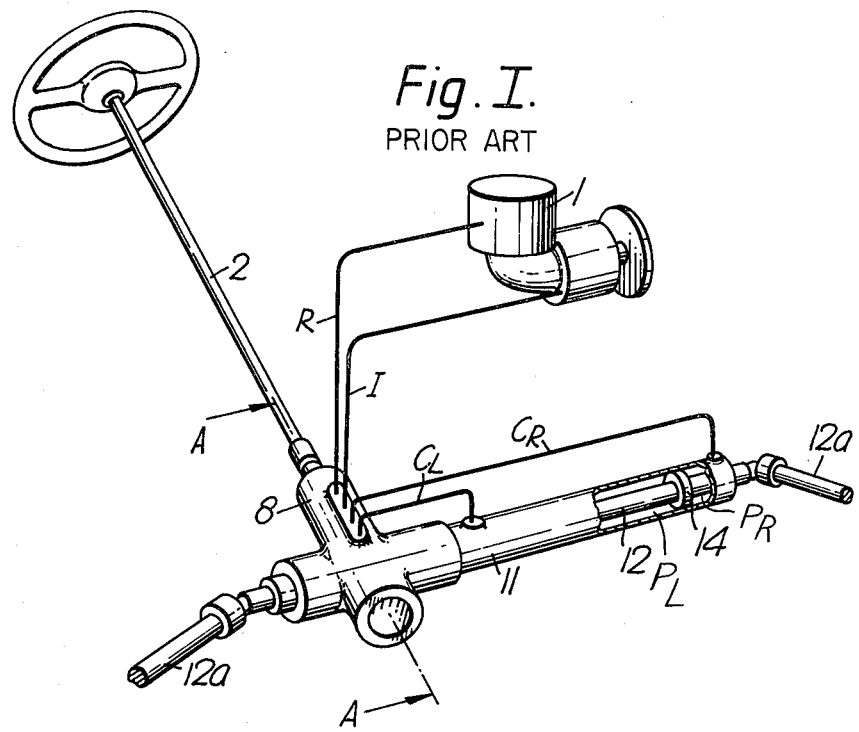
Fig. I.
PRIOR ART
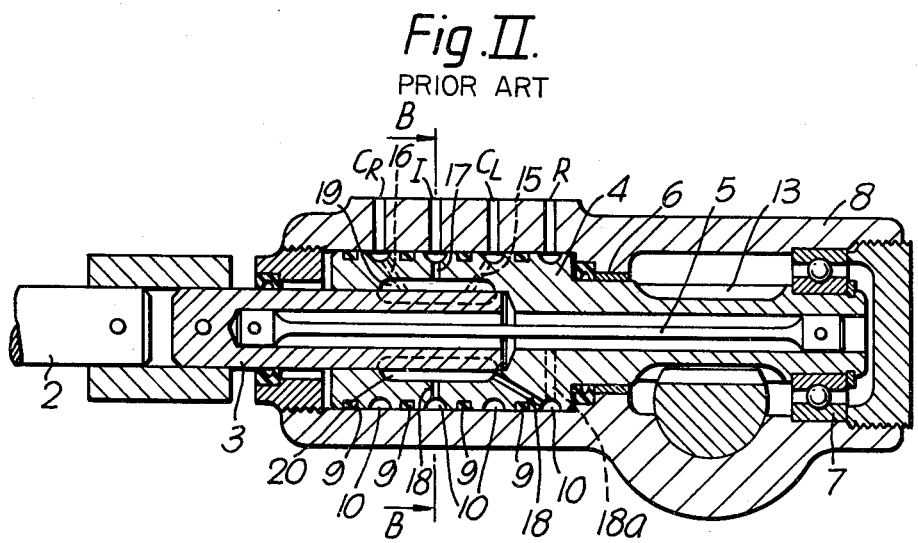
Fig. II.
PRIOR ART

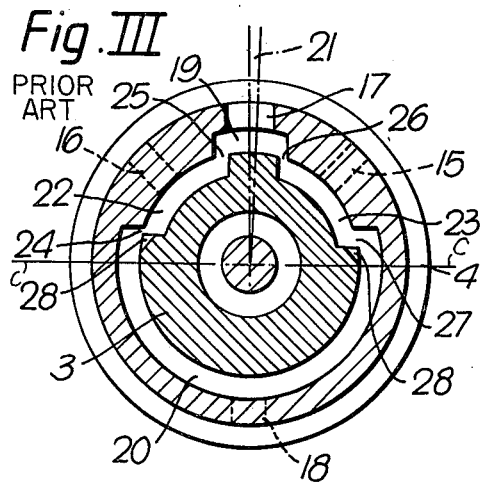
Fig. III PRIOR ART
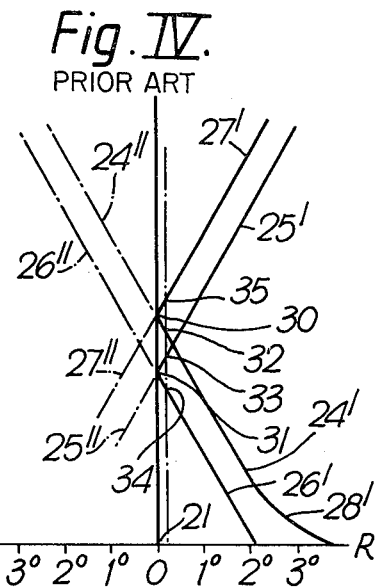
Fig. IV. PRIOR ART
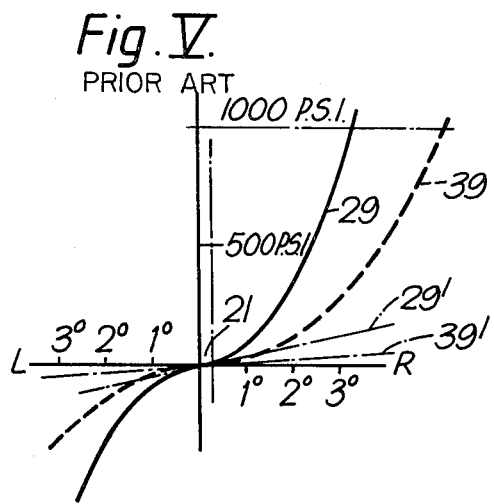
Fig. V. PRIOR ART
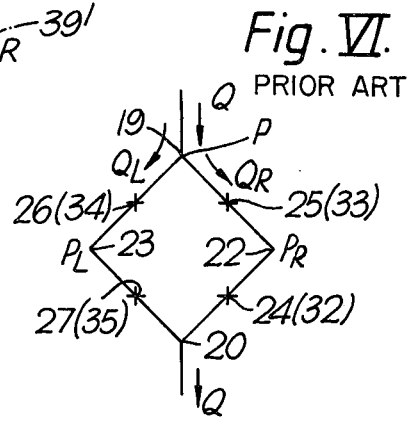
Fig. VI. PRIOR ART

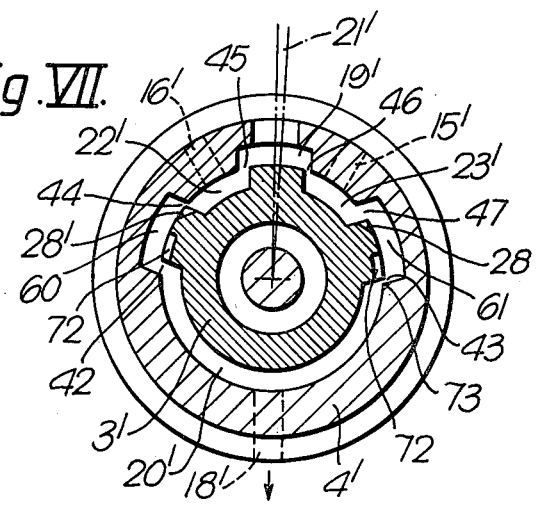
Fig. VII.
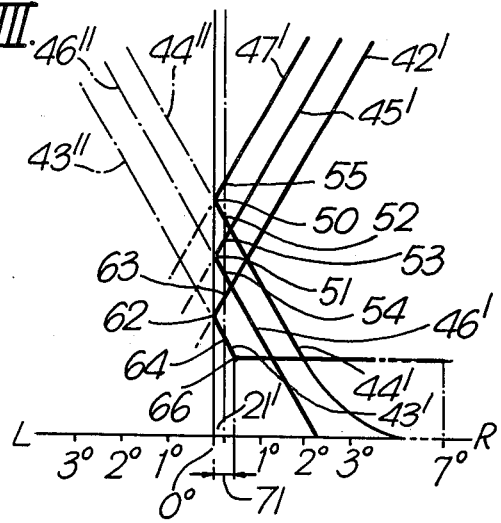
Fig. VIII.
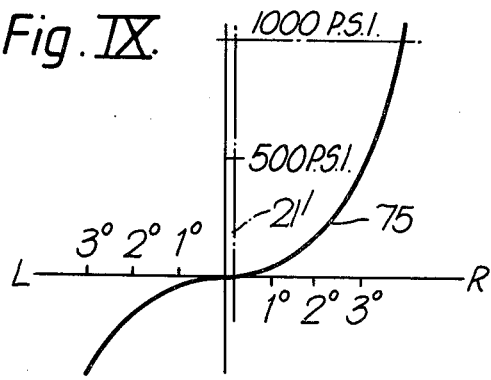
Fig. IX.

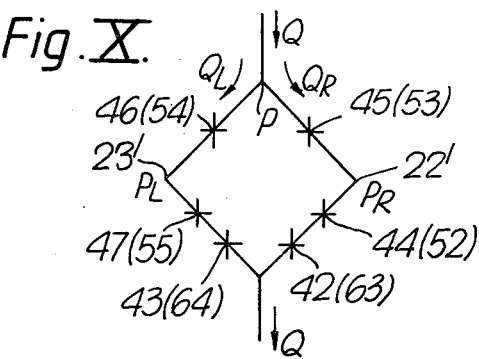
Fig. X.
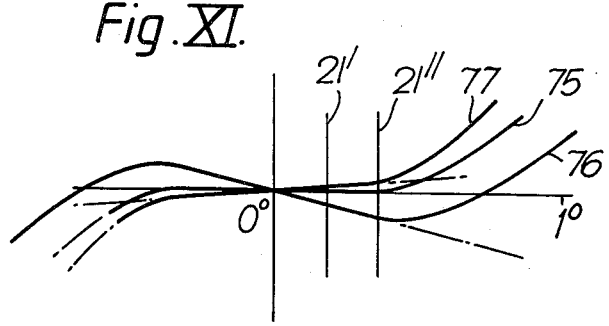
Fig. XI.
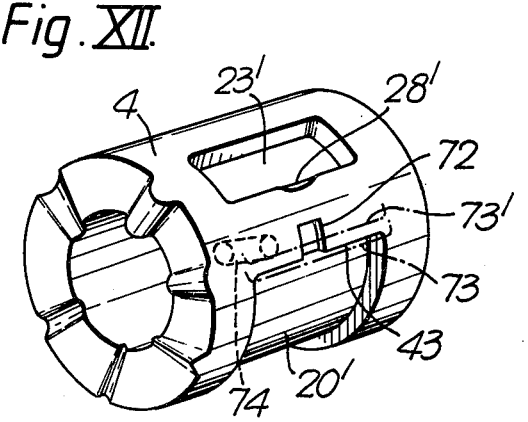
Fig. XII.

POWER STEERING VALVE

This is a continuation of application Ser. No. 115,412 filed on Jan. 25, 1980, now abandoned.

This invention relates to the hydraulic control valves used in the power steering gears of cars and trucks.

Such steering gears comprise an input shaft connected to the steering wheel, an output shaft connected to the steered road wheels, a geared connection between these shafts, and a double acting hydraulic assist motor, usually a cylinder also connected to the output shaft. The output force of the steering gear is thus the sum of the driver's efforts transmitted through the gearing and the force supplied by the assist cylinder.

In rack and pinion types of steering now increasingly used, the above output shaft is replaced by a transverse rack-rod, around which is arranged the assist cylinder.

The operation of the assist cylinder is controlled by a valve located between the steering wheel and the input shaft, which directs oil from an engine-driven pump to one side or the other of the assist cylinder, thus providing assist in either the right or left turn directions as required. Generally, the engine-driven pump is regulated so as to supply a constant flow of oil to the valve and cylinder irrespective of engine speed.

The valve is generally spring-centered to a neutral mode or position so as to provide neither right nor left assist when no steering effort is required, as when the vehicle is being driven straight on a smooth, flat road. When forces are being transmitted from the steering wheel to the input shaft or vice-versa, the spring centering yields and the valve moves to an operative position and so directs oil to the cylinders to assist the driver's efforts.

The valve ports are arranged to provide increased assist as increased steering efforts are required, and thus the system operates as a force amplifier. Conversely, steering forces from the road wheels are transmitted back to the driver at a reduced level, (being opposed by the assist cylinders) so providing the road feel which helps the driver judge appropriate speed and steering motions. Also, the steering wheel always tends to return to the straight-ahead position after a turn.

When driving straight at high speeds the efforts required to steer are very small, and the road feel and steering wheel return action become masked or even entirely lost in the friction of the steering system. This is particularly a problem in power rack and pinion systems where friction is always high. In these systems it is desirable that the amplifier action just described is reduced to a minimum. There are many inventions in which the amplifier action of the valve is suppressed by a separate mechanical device when driving fast, but few have been used because of the added complexity.

On the other hand, when parking a vehicle stationary very high efforts are needed to turn the steered wheels, and the valve is generally designed to provide greatly increased assist here, with little increase in driver steering effort. The valve operates more as an on-off device rather than an amplifier.

The various regimes of operation of a power steering gear are described in detail in U.S. Pat. No. 2,865,215.

A further aspect of steering valve operation relates to the responsiveness or accuracy of the steering gear. It is well known that all assist (or servo) systems introduce an error or loss of accuracy. For example, when the spring centering, referred to earlier, yields, there is a loss of the driver's input movement transmitted to the road wheels. Conversely, if the forces required to steer the wheels change due to cross-winds or road irregularity, the steering output moves and allows the vehicle to respond in error even if the driver holds the steering wheel motionless. This loss of accuracy is particularly detrimental when driving straight at high speeds. These losses can be minimized by making the valve very responsive, but then, as is well known in the art of design servo systems, the steering gear is likely to become unstable and to vibrate.

Many solutions to these various problems have been tried. For example:

The formerly commonly used hydraulic valve provides a positive centering spring to hold the valve in the centered and hence inoperative position until some threshold value of steering force is reached. The yielding of the centering spring at some set value, however, tends to provide a sudden discontinuity or step affecting both the feel and response of the steering system.

More recently, rotary valves have been used, as for example, as described in U.S. Pat. No. 3,022,772, in which the centering spring is a torsion bar, and therefore without step or discontinuity in action.

However, some valve movement occurs in such valve systems even with the slightest rise in steering effort, and, according to the design used hitherto, inevitably produces some assist. This assist, though small, detracts from the driver's feel of the road and the return of the steering wheel to the straight-ahead position. The amount of assist of such valves on center can be reduced by providing a zone on center where the valve movement has little effect in providing assist. However, the response of such valves then becomes markedly reduced. This point will be dealt with in detail later.

Another system now much in vogue aimed at reducing on the center assist provides that the supply of oil decreases as the speed of the vehicle increases. This is unsatisfactory as will be described later.

The present invention in preferred forms relies solely on the use of a simple and well tried torsion bar centering, and seeks to overcome the aforementioned problems of center boost or assist and poor response by subtlety of valve design.

Rotary valves, as currently widely used, typically have one or more sets of ports arranged in a symmetrical manner, each set including an inlet port to receive oil from the pump, an outlet port to collect oil for return to the pump reservoir and right and left turn ports for communicating oil to and from the assist cylinders. The right and left turn ports are arranged between the inlet ports and the outlet ports and are separated therefrom in each case by a variable orifice. Thus oil flowing from the inlet port to the outlet port comprises two streams each having two variable orifices in the stream, and a cylinder port between them.

The pressure in the outlet port will generally be negligible, being directly connected to the pump reservoir. The pressure in the right and left turn cylinder ports will therefore depend on the proportion of the total flow passing through the right and left streams of the valve, and the degree of restriction of the several variable orifices.

In the centered or neutral position of the valve as when travelling straight and no steering effort is required, the flow of oil in the two streams will be equal, and the pressure in the right and left hand cylinders will also be equal. In substantially all other conditions of operation as when the driver applies steering effort to the steering wheel asymmetry of flow and pressure will occur providing a difference of pressure in either right or left turn cylinder ports which will boost or assist the driver's steering effort. Such boost or assist will also occur when road forces act to deflect the steering wheel from the position determined by the driver.

In preferred forms of rotary valves constructed according to the present invention an additional variable port or restriction is added in the right and left streams of oil in a manner which will be apparent from the following description of a preferred form of the invention.

SUMMARY OF THE INVENTION

The present invention consists in a hydraulic control valve for a vehicle power steering system comprising an inlet and a return port for hydraulic fluid supplied by a pump, outlets from said valve for connection to right and left turn sides of an hydraulic motor arranged to supplement turning forces transmitted from a steering wheel to a steered road wheels of the vehicle, said valve having at least one pair of symmetrical passages connecting the inlet to the return port, each passage having therein two variable area orifices with an outlet interposed therebetween, said orifices being defined by relatively movable parts of the valve, said orifices being arranged so that when, by reason of relative movement between said parts, the first orifice in the passage is in the course of closing the second orifice is in the course of opening and vice versa according to the magnitude and direction of turning forces applied to produce relative movement of said parts so that hydraulic fluid is directed towards the interposed outlet or away therefrom respectively to cause said hydraulic motor to produce a force supplementing said turning forces, of the appropriate magnitude and direction characterized in that, in at least one pair of passages, an additional orifice is added between the outlet and return port which is closing when the above-mentioned orifice lying between the outlet and the return port is opening and vice versa such that when the applied turning forces are small, the supplementary turning force is less than would have been the case in the absence of such additional ports.

In order that the nature of the invention may be better understood a preferred embodiment thereof is hereinafter described by way of example, with reference to the accompanying drawings in which:

BRIEF DESCRIPTION OF THE DRAWING

FIG. I is a general view of the main parts of a conventional power assisted rack and pinion steering system, FIG. II is a median cross sectional view through the housing enclosing the valve and pinion, on line A—A of FIG. I.

FIG. III is a transverse cross-sectional view through the valve, on line B—B in FIG. II in a simplified, two-stream version, FIG. IV is a graph illustrating the relationship between relative rotation of valve elements and orifice areas, FIG. V is a graph showing the assist or boost characteristics of the valve, FIG. VI is a diagram illustrating the oil flow through the valve, FIG. VII is a cross-sectional view, similar to the cross-sectional view shown in FIG. III of a conventional valve, of a valve constructed according to the invention, FIG. VIII is a graph corresponding to that of FIG. IV but in respect of the valve of FIG. VII, FIG. IX is a graph illustrating the boost characteristics of the valve of FIG. VII, FIG. X is a diagram illustrating the flow of oil through the valve of FIG. VII, FIG. XI is an enlarged view of the center area of the graph of FIG. IX, and FIG. XII is a perspective view of the sleeve of the valve shown in FIG. VII.

It is to be noted that FIGS. II, III, VII and XII illustrate greatly simplified forms of valves used in practical applications, for clarity and ease of explanation.

DESCRIPTION OF THE PREFERRED EMBODIMENT

Engine driven pump 1 is connected to the steering gear by inlet pipe I and return pipe R.

Steering shaft 2 is coupled to shaft-valve 3 which forms the inner member of a rotary valve. Shaft-valve 3 (hereinafter referred to as the valve 3) closely fits to sleeve-pinion 4 (hereinafter referred to as the sleeve) and is capable of limited relative rotation therein. Stops, not shown, limit this relative rotation to, typically, about 7° each way from the centered position. Valve 3 and sleeve 4 are spring centered to a neutral position by torsion bar 5, secured at the upper and lower end to valve 3 and sleeve 4 respectively. Sleeve 4 is journalled at 6 and 7 in housing 8 and is provided with a series of seals 9 separating a series of circumferential grooves 10. These grooves communicate through drilled holes in the housing to external pipes I and R to the pump, and similarly via pipes CL and CR to the opposite ends of power cylinder 11.

Cylinder 11 is arranged coaxially with rack 12 and is secured to housing 8.

Sleeve 4 has integrally formed on its lower end pinion 13 which engages teeth cut in the rack 12. Steering forces or movements applied by the driver to steering shaft 2 are transmitted by torsion bar 5 to pinion 13 and so to rack 12. The ends of rack 12 are connected by tie-rods 12a to the steering arms of the front wheels of a car or truck (not shown) in the usual manner.

Oil passing from housing 8 through pipes CL and CR acts respectively at PL and PR to produce pressure differentials between the appropriate sides of piston 14 and so applies additional forces on rack 12 to assist the driver's movements or steering forces transmitted as described above.

Referring now to FIG. II, the grooves 10 aligned with connections to pipes CL and CR are provided with drilled passages 15 and 16 respectively which terminate in the inner surface of the valve sleeve.

The grooves 10 aligned with inlet pipe I and return pipe R are similarly provided with drilled passages 17 and 18 respectively which enter blind-ended, axially extending ports or passages 19 and 20 respectively formed in the inner surface of sleeve 4.

The manner of operation of a conventional rotary valve may best be described by references to FIGS. III through VI. FIG. III is a cross-section of the valve which, for the sake of simplicity, has only a single set of ports or orifices whereas in most valves two, three or even four sets are used. For example, in U.S. Pat. No. 3,022,772 four sets of ports and orifices are used in each stream. Thus, if two sets of ports were used, all features of the valve of FIG. III along line C—C would be repeated in the lower half of the Figure. Return port 18 would be placed on line C—C and duplicated.

In FIG. III the valve 3 is shown turned in a right turn through some small angle 21 from the centered position of symmetry within sleeve 4. Ports 22 and 23 formed in the outer surface of valve 3 are also blind-ended as were ports 19 and 20 in sleeve 4. The longitudinal edges of these ports are aligned with the ports formed in the inner surface of sleeve 4 in such a way as to define four orifices 24, 25, 26 and 27 which will vary in area according to the relative turning of the valve elements.

The edges of the ports may be straight but more usually will be provided with chamfers or notches, as for example at 28 at orifices 24 and 27, so that the change of area with relative turning of the valve elements will not be constant, but will vary. This feature of rotary valve design is well known in the art. For example, in the U.S. patent referred to above, the notching of the port edges is described in great detail. The purpose of the notching in that case is to provide for a very specific type of assist or boost characteristic as described in that specification. Curves or plots of the changes of area with angle of turn of the valve are also shown. In the present invention similar types of notching may be used or alternatively simple chamfers over part of the length of the port as indicated at 28.

However, as the purpose of this invention relates primarily to the characteristics of the valve on or near its centered position, where valve notching has little effect, simple chamfers will be described.

Variable orifices 24–27 take the form of narrow slots of length equal to the length of the ports and having a width determined by the relative rotation of the valve elements. It follows that the areas of these orifices will change substantially proportionally with relative rotation of the valve elements. Such a relationship is illustrated in the graph of FIG. IV where the horizontal ordinate shows a relative rotation of the valve elements and the vertical ordinate the orifice areas. Lines 24'–27' on this graph shows the relation of angle versus area for corresponding orifices of FIG. III in a right turn. Had the valve been turned to the left, the respective areas would have been as shown by the chain dotted lines 24"–27".

It will be seen that the area-line 24' deviates from a straight line between 2° and 3° as at 28' because of the effect of chamfers 28.

Area lines for the inlet orifices 25 and 26 will often be different from those of the outlet orifices 24 and 27, particularly on center as at points 30 and 31 in FIG. IV. However, the slopes of all lines to the vertical axis will generally be very similar (except where chamfers are used as at 28).

FIG. V shows the assist or boost characteristic of such a valve. The horizontal ordinate again shows the relative rotation of the valve elements, and the vertical ordinate the difference of pressure in the right turn cylinder and the left turn cylinder.

This curve 29 of pressure difference may be calculated with a high degree of accuracy from the known areas of the valve orifices as shown in FIG. IV using a well-established flow equation for orifice flow:

$$P = (Q^2/K^2 A^2)$$

K is a constant of a value, for oils commonly used in power steering systems, of about 31.9, Q is the flow, A is the orifice area and P is the pressure, all units being in the imperial system.

In order to solve the equations for the difference of pressure in the right and left hand cylinders, it is necessary first to consider the way in which the flow of oil divides between the right and left turn streams within the valve.

This division of oil flow is better understood with reference to FIG. VI, which shows, diagrammatically, the flow within the valve. Regulated flow Q enters the valve from the pump and divides into left and right turn streams of volumes QL and QR, the former passing successively through orifice 26, port 23 and orifice 27, and the latter through orifice 25, port 22 and orifice 24. The figures in brackets in FIG. VI denote the areas indicated by those figures in FIG. IV of the respective ports when the valve is turned through small angle 21. When steering is taking place, some oil flows between port 22 and port 23 but for most of the time such flow is only a small percentage of the total flow Q (particularly in on-center driving), and its effects will be ignored in further consideration of valve operation which in this specification is primarily concerned with on-center operation.

Now considering, for example, flow of oil in the left stream, volume QL passes through orifices having areas 34 and 35 in succession. The pressure causing this flow P must be the sum of pressure drops caused by these two orifices.

Hence $$P = \frac{QL^2}{K^2}\left[\frac{1}{(34)^2} + \frac{1}{(35)^2}\right]$$

for the left stream. But P also equals $$\frac{QR^2}{K^2}\left[\frac{1}{(33)^2} + \frac{1}{(32)^2}\right]$$

for the right stream.

As QL plus QR is known i.e. Q), actual values of QL and QR can readily be found. Applying these flows to orifice areas 35 and 32, PL and PR can also be found, and hence PL−PR, the differential pressure applied upon steering motor piston 14.

The plot of differential pressure versus valve angle can now be plotted, as shown in FIG. V by line 29 for a conventional rotary valve. Here valve angle appears as the horizontal ordinate and differential pressure in imperial units as the vertical ordinate. The rate of change of pressure through center, a line as at 29' can be calculated by considering the pressure rise for some small angle 21, and will typically be about 10 to 20 psi per degree. This will result in the steering gear having a considerable degree of boost through center, which is undesirable for good "feel" and "returnability" as mentioned earlier.

Some improvement in these qualities is obtained if the areas of all orifices are increased to give a plot as shown at 39 having a rate of change of pressure on center of 39'. However, now the response of the valve becomes poor in that large operating angles are required.

In a valve made according to the invention the slope line 29 can be reduced to zero without significantly affecting the response to the steering gear.

The manner in which this is accomplished will now be described with reference to FIGS. VIII to XII. In a valve constructed according to a preferred form of the invention additional variable orifices are added in each of the left and right turn streams of the valve, either between inlet port 19 and cylinder ports 22 and 23, or between these ports and outlet port 20. The latter location is preferred. The unique quality of these additional orifices 42 and 43 is firstly, that they have a lesser area on center than either of the other ports in the stream and secondly, that they close only to some predetermined value after which they close at a lesser rate or even zero rate. They never fully close.

The additional orifices are required to dominate the flow of oil within the valve for a small operating angle, but cease to dominate at larger angles so allowing a reversion to normal valve action.

Consider, for example, the condition of the valve in FIG. X, when the valve has turned to some small angle 21' and the orifices have the values (in brackets) derived from the area plot of FIG. VIII. Area 54 will be smaller than area 53 yet pressure PL is required to equal (or exceed) PR. It follows that QR must be greater than QL by at least the fraction: ((53)/(54))

This is notwithstanding that 44 has closed and 47 opened tending to drop pressure PL and increase PR. Clearly, the effect of the additional orifices must be such as to change the proportion of oil in the left and right streams to such a degree as to negate the effects of the remaining pairs of orifices. Such dominance will only occur if all six orifices have suitably related center areas and rates of change of areas.

By way of example, in the design of such a zero-boost valve, it will be assumed that the areas of the four main orifices in FIG. VIII are the same as for FIG. IV. For the case of the valve turned to small angle 21', we can now substitute values of areas 53 and 54 and determine the fraction (QR/QL) as mentioned above, and their values. Now applying the requirement of zero boost at angle 21', $$PL = PR = \frac{QL^2}{K^2}\left[\frac{1}{(55)^2} + \frac{1}{(64)^2}\right] = \frac{QR^2}{K^2}\left(\frac{1}{(52)^2} + \frac{1}{(63)^2}\right)$$

Substituting values of areas 55 and 52 as used in the conventional valve (i.e. 35 and 32) there are two remaining variables, areas 63 and 64. As soon as a value for one area, e.g. 63 is chosen, then 64 is fixed.

But 63 and 64 must differ from center area 62 by about the same amount (as the rate of change of area of the orifice, i.e. the slopes of 42' and 43' cannot change suddenly on center). Hence, by trial and error, suitable values for area 62 and the slopes of 42' and 43' can be found. The procedure is repeated for a series of small angles up to angle 21' beyond which zero center-boost is no longer required. Typically, angle 21'' will be about $\frac{1}{4}°$ to $\frac{1}{2}°$. Angle 21'' would normally be smaller than angle 71 where line 43' turns as at 66 to become of constant area.

FIG. XI is an enlarged view of the center area of the graph of FIG. IX showing in the horizontal ordinate up to 1° of right turn valve rotation. Here it will be seen that boost line 75 remains zero until angle 21'' is reached, after which it smoothly increases.

Alternatively, a boost line 76 may be desired providing negative boost through center, that is, PL>PR until about $\frac{3}{8}°$. The desired PL−PR is calculated for each small angle of turn and the appropriate ratio (QR/QL) is found. As before, suitable values of 63 and 64 can now be calculated as for the case where zero boost was desired. Again some small degree of boost as shown by boost line 77 may be desired, but this will always be less than that provided by a conventional valve.

It will be recalled that orifices 42 and 43 are required to close rapidly at first indicated by the steep slope of 43' but to cease closing as at point 66 and remain open even until the valve stops are reached as, for example, at 7°.

Two convenient ways of doing this are illustrated in FIGS. VII and XII.

The additional orifices 42 and 43 have flow control areas which variably adjust the flow therethrough and never fully close. A recess or notch 72 is formed in the lands of valve 4' adjacent to port 20' which will generally be of constant radial depth and annular length. This notch will continue sufficiently far around the periphery of the valve land so that edge 73 of port 61 in sleeve 3' never closes off the notch. Thus, in FIG. XII the dotted line 73 shows the edge of port 61 at operating angle 21', and the line 73' its position at maximum valve angle. Slight variations of the form of the notch to achieve slight variations of area when closing may be desirable.

Alternatively, the notch may be eliminated and the constant area beyond point 66 provided by a drilled hole as shown dotted at 74. Such a hole or holes may be drilled through the valve land to the center of the valve from which it can return to the appropriate groove 10 via hole 18a of FIG. II.

The operation of the valve as described above will normally impose some extra back pressure to oil flow through the valve because of the additional restrictions 42 and 43. However, the restrictions of the orifices in a power steering gear generally cause only a small part of the total back-pressure and hence the increase will be negligible. Furthermore, it is widely known that a high back-pressure in a steering gear tends to suppress oil flow noises, for example, "hiss" and "whistle". Such noises are more likely to occur at higher pressures as when parking, and some steering systems impose extra back-pressure on the steering gear when operating at such high pressures.

Certain designs also incorporate extra restrictions in the rotary valve which come into effect at larger valve angles in order to produce a higher back-pressure at large valve operating angles than apply on center, and so suppress noises.

It is coincidental to this invention that it may also act to apply increased back pressure when operating at larger valve angles and so suppress hiss, etc. It should be noted that the desirable result of reducing the on-center boost will only occur if the specific rules of choosing the characteristic valve area curves are observed.

Although the drawings accompanying the specification show a simple form of valve in which there is but one stream of oil used in each direction, it is desirable that at least three streams are used for passenger car valves and four streams for truck valves. Such valves would therefore have either nine ports in both valves and sleeve or twelve ports respectively.

It will be recognized by persons skilled in the art that numerous variations and modifications may be made to the invention as described above without departing from the spirit or scope of the invention as broadly described.

I claim as my invention:

1. A hydraulic control valve for a vehicle power steering system comprising an inlet port and a return port for hydraulic fluid flow supplied by a pump, a hydraulic motor means for effecting a right or left turn force as a function of a pressure differential between right and left sides in said motor means, corresponding outlets formed in said valve for respective fluid flow connection to said right and left sides of said motor means, said motor means being connected to supplement turning forces transmitted from a steering wheel to vehicle wheel steering means, said valve having at least one pair of symmetrical passages connecting the inlet port to the return port, each passage having spaced therein a first variable area orifice adjacent said inlet port and a second variable area orifice adjacent said return port defined by relatively movable parts of the valve with one of said outlets respectively interposed in each said passage between said first and second orifices, said orifices being arranged in each said passage so that, by reason of relative movement between said parts, when the first orifice in the one passage is in the course of opening the second orifice is in the course of closing and when the first orifice in the one passage is in the course of closing the second orifice is in the course of opening according to the magnitude of turning forces applied to produce relative movement of said parts so that hydraulic fluid is directed towards the interposed outlet of the respective passage or away therefrom respectively to cause said motor means to produce a force supplementing said turning forces, the improvement comprising in that, in each of said at least one pair of passages, an additional orifice is added between the outlet in that passage and return port, which additional orifice is closing when the second orifice lying between the outlet in that passage and the return port is opening such that, when the turning forces transmitted from said steering wheel are small, the additional orifice restricts the flow of hydraulic fluid from the outlet to the return port providing a back pressure at the outlet in that passage whereby the turn force effected by said motor means is less than would have been the case in the absence of such additional orifice.

2. A hydraulic control valve as claimed in claim 1 wherein, all of the said variable area and additional orifices are constructed and arranged so that, when the turning forces transmitted from said steering wheel are small, a back pressure is produced in the hydraulic fluid flow through the outlet to the low pressure differential side in said motor means.

3. A hydraulic control valve as claimed in claim 1 or claim 2 wherein the valve is a rotary valve having an outer sleeve and an inner concentric rotor, said variable area and additional orifices being defined between radial edges formed in the surface of the rotor and the inner surface of the sleeve.

4. A hydraulic control valve as claimed in claim 3 wherein the radial edges associated with said additional orifices contain flow control areas such that, when closing, said additional orifices reduce in area rapidly from an open position to some predetermined degree of relative movement of said parts and thereafter maintain a substantially constant area during further relative movement.

5. A hydraulic control valve as claimed in claim 4 wherein said flow control areas comprise the provision of a notch in at least one of said corresponding radial edges associated with each said additional orifice, said notch having substantially constant radial depth such that each said additional orifice never closes.

* * * * *